United States Patent
Atarashi

(10) Patent No.: US 6,967,419 B2
(45) Date of Patent: Nov. 22, 2005

(54) MOTOR FOR HYBRID VEHICLE

(75) Inventor: Hirofumi Atarashi, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 111 days.

(21) Appl. No.: 10/669,354

(22) Filed: Sep. 25, 2003

(65) Prior Publication Data
US 2004/0063536 A1 Apr. 1, 2004

(30) Foreign Application Priority Data

Sep. 27, 2002 (JP) .............................. 2002-283766
Jul. 14, 2003 (JP) .............................. 2003-196562

(51) Int. Cl.$^7$ ............................ B60K 6/00; H02K 1/27; H02K 21/24
(52) U.S. Cl. ............ 310/103; 310/156.08; 310/156.32; 310/268; 180/65.1
(58) Field of Search .......................... 310/51, 268, 103, 310/261, 156.08, 156.32, 156.33, 156.34; 180/65.1–65.4; 192/84.3; 464/29

(56) References Cited

U.S. PATENT DOCUMENTS

| | | | |
|---|---|---|---|
| 4,605,874 A | * | 8/1986 | Whiteley .................... 310/268 |
| 5,001,412 A | * | 3/1991 | Carter et al. .................. 322/10 |
| 5,402,024 A | * | 3/1995 | Watanabe et al. ....... 310/156.12 |
| 5,569,108 A | * | 10/1996 | Cadee et al. .................... 475/1 |

FOREIGN PATENT DOCUMENTS

JP 2001-298804 * 10/2001 ........... B60L 11/14

* cited by examiner

Primary Examiner—Burton Mullins
(74) Attorney, Agent, or Firm—Arent Fox PLLC

(57) ABSTRACT

A motor for a hybrid vehicle is provided in which miniaturization of the drive system and transmission system can be achieved while maintaining driving performance. A drive plate 23 which connects a crank shaft 2 of an engine 1 to a transmission 3, is provided with a rotor base section 3 orthogonal to an axis C of the crank shaft 2, and a plurality of magnets 21 having pole faces facing in a direction along the axis C, are mounted on the rotor base section 3 to form a rotor 30, and there is provided a stator 32 with a plurality of conductive coils 22 arranged so as to face the magnets 21 of the rotor 30 in a direction along the axis C.

6 Claims, 7 Drawing Sheets

MOTOR FOR HYBRID VEHICLE

FIELD OF THE INVENTION

Priority is claimed to Japanese applications No. 2002-283766, filed Sep. 27, 2002, and Japanese application No. 2003-196562, filed Jul. 14, 2003, which are incorporated herein by reference.

BACKGROUND OF THE INVENTION

1. Field of the Invention

The present invention relates to a motor for a hybrid vehicle, and particularly relates to miniaturization and weight reduction of the motor.

2. Description of the Related Art

As a motor for hybrid vehicles, there is for example a motor 10 as shown in FIG. 7, which comprises a rotor 6 with magnets 5 mounted on a peripheral section of a drive plate 4 provided between a crank shaft 2 of an internal combustion engine 1 and a transmission 3, and a stator 7 provided facing this rotor 6 in the radial direction. As a result, it is possible to rotate the rotor 6 about the same axis as the crank shaft 2, and to assist the drive of the engine 1 as well as regenerating part of the kinetic energy of the vehicle. The base section of the rotor 6 is integrally formed with the drive plate 4 by press-forming, so that a reduction in the number of parts and weight is achieved, as shown, for example, in Japanese Unexamined Patent Application, First Publication No. Hei 11-332010.

However, as the commercial application of hybrid vehicles advances, further improvement in performance is being investigated, and one major problem is weight reduction and miniaturization of some parts such as the battery and motor, etc for exclusive use in hybrid vehicles. In particular, for the motor 10 arranged between the engine 1 and the transmission 3 as described above, in addition to the need to consider the heights of the coil ends, their size has a direct effect on the outside dimensions of the drive system and transmission system. Therefore, further miniaturization of the motor is desired in order to realize more easy installation of the motor on the vehicle.

SUMMARY OF THE INVENTION

The present invention takes the above situation into consideration, with the object of providing a motor for a hybrid vehicle in which miniaturization of the drive system and transmission system can be achieved while maintaining driving performance.

As a means to solve the above problem, a first aspect of the present invention is a motor for a hybrid vehicle, arranged between an internal combustion engine and a transmission, wherein there is provided on a drive plate (for example, the drive plate 23 in the embodiment) which connects a crank shaft of the engine (for example, the crank shaft 2 in the embodiment) to the transmission, a rotor base section (for example, the rotor base section 31 in the embodiment) orthogonal to an axis of the crank shaft, and a plurality of magnets (for example, the magnets 21 in the embodiment) having pole faces facing in a direction along the axis, are mounted on the rotor base section to form a rotor (for example, the rotor 30 in the embodiment), and there is provided a stator (for example, the stator 32 in the embodiment) with a plurality of conductive coils (for example, the coils 22 in the embodiment) arranged so as to face the magnets of the rotor in a direction along the axis.

As a result, a motor arranged between the engine and the transmission can be an axial gap type motor, formed flat along the drive plate, with coil ends which do not protrude in the radial direction.

A second aspect of the invention is a motor for a hybrid vehicle according to the first aspect, wherein the drive plate and the rotor base section are integrally formed by press-forming.

As a result, it becomes possible to form an axial type rotor by effective use of the intrinsic shape of the drive plate.

A third aspect of the invention is a motor for a hybrid vehicle according to the first and second aspects, wherein a mounting section for the magnets on the rotor base section is a highly rigid section having a desired rigidity (for example, the highly rigid section 39 in the embodiment), and a section where the magnets are not mounted is a resilient section (for example, the resilient section 40 in the embodiment) allowing a predetermined elastic deformation.

As a result, it becomes possible to retain the magnets at the highly rigid section, and to reproduce the intrinsic elastic property of the drive plate by deforming the resilient section.

A fourth aspect of the invention is a motor for a hybrid vehicle according to the third aspect, wherein the resilient section is provided so as to be inclined with respect to a radial direction of the rotor.

As a result, it becomes easy to bend the resilient section while maintaining its length, enabling each highly rigid section to relatively displace in the circumference direction and radial direction of the rotor.

A fifth aspect of the invention is a motor for a hybrid vehicle according to the third and fourth aspects, wherein ribs (for example, the ribs 38 in the embodiment) are formed in the highly rigid section for suppressing deformation.

As a result, it becomes possible to provide a difference in rigidity between the highly rigid section and the resilient section, by the presence or absence of the deformation suppressing ribs.

A sixth aspect of the invention is a motor for a hybrid vehicle according to the third and fourth aspects, wherein a plurality of ribs (for example, the ribs 38' in the embodiment) are formed in the highly rigid section.

As a result, it becomes possible to provide a difference in rigidity between the highly rigid section and the resilient section, by the presence or absence of the plurality of ribs, and to also make the degree of protrusion of the ribs larger to function as cooling fins.

A seventh aspect of the invention is a motor for a hybrid vehicle according to the third through sixth aspects, wherein a plate thickness of the highly rigid section is thickly formed with respect to a plate thickness of the resilient section.

As a result, the rigidity of the highly rigid section is reliably increased by increasing the plate thickness, so that it is possible to provide a difference in rigidity between the highly rigid section and the resilient section.

An eighth aspect of the invention is a motor for a hybrid vehicle according to the third through seventh aspects, wherein the resilient section has apertures (for example, the elongate apertures 44 in the embodiment) which induce deformation.

As a result, it becomes possible to provide a difference in rigidity between the highly rigid section and the resilient section, by the presence or absence of apertures.

BRIEF DESCRIPTION OF DRAWINGS

FIGS. 3A and 3B are diagrams showing the drive plate, wherein FIG. 3A is a diagram of the drive plate viewing from the arrow B in FIG. 1, and FIG. 3B is a cross-section of the drive plate along the line D in FIG. 3A.

FIG. 6A is a diagram viewing from the arrow B, similarly to FIG. 3A, and FIG. 6B is a cross-sectional diagram, similarly to FIG. 3B.

DETAILED DESCRIPTION OF THE INVENTION

Hereunder a first embodiment of the present invention will be described with reference to the drawings.

Figure 1:
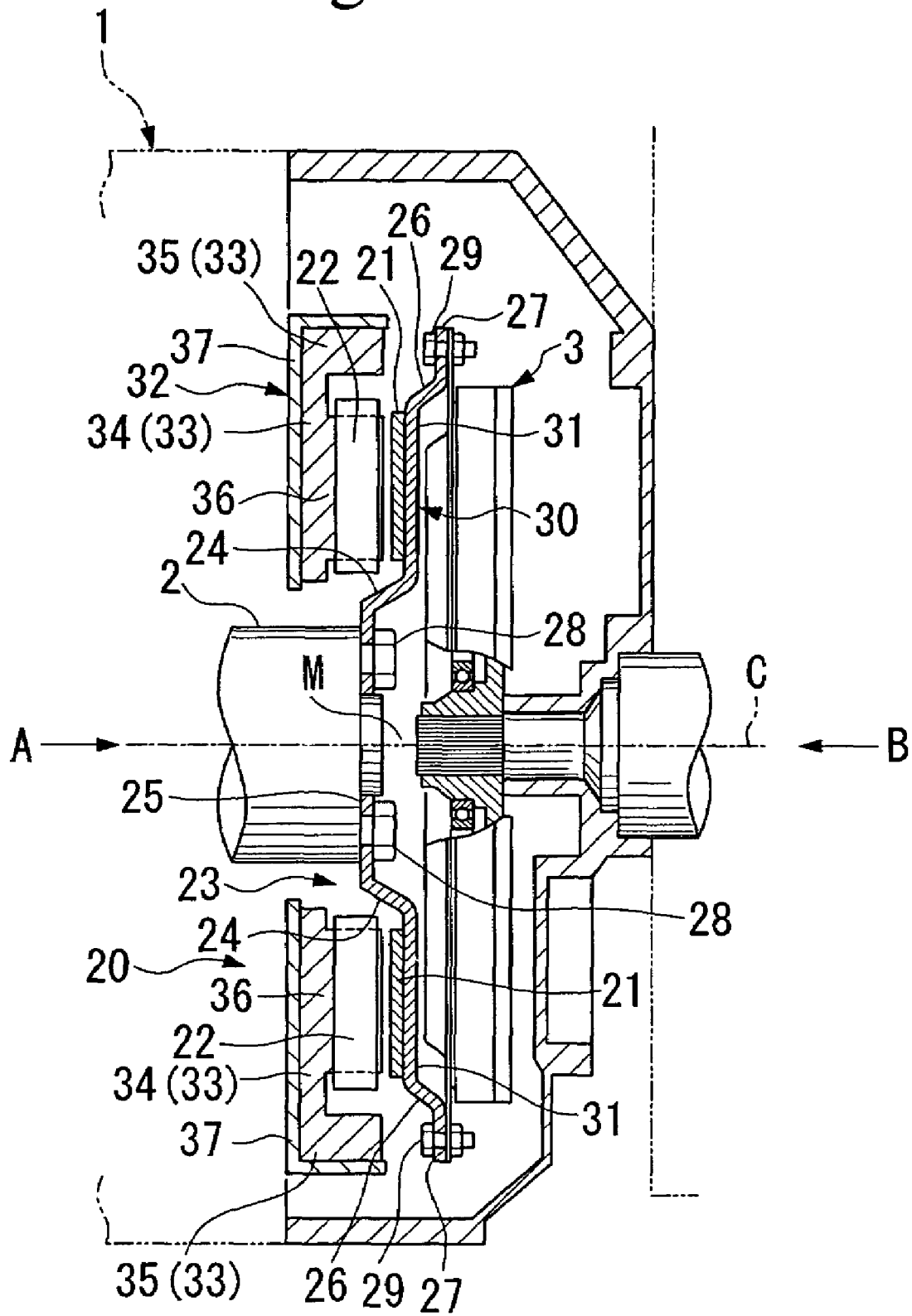
FIG. 1 is an explanatory cross-section diagram of a motor according to a first embodiment of the present invention.

As shown in FIG. 1, a motor 20 for a hybrid vehicle according to the present invention is built in between an internal combustion engine 1 and a transmission 3, and is arranged in such a way that each axis of the motor 20, a crank shaft 2 and the transmission 3 share the same axis C. The motor 20 is a three-phase alternating current type, and is constituted by an axial gap type motor with magnets (permanent magnets) 21 being a rotor, and coils (electromagnets) 22 being a stator, arranged facing each other in a direction along the axis C. This motor 20 receives a supply of electricity to assist the drive of the engine 1, and when the vehicle decelerates, kinetic energy is input from the transmission 3, and a part of this is regenerated.

Furthermore, a drive plate 23 provided between the crank shaft 2 and the transmission 3 is a flat member arranged orthogonal to the axis C. This transmits torque between the engine 1 and the transmission 3, and also has the function of accommodating any disparity of centers of the axes by means of a predetermined elastic property. The drive plate 23 is integrally formed in a disk shape by means of press-forming from a steel plate, and a central section thereof is transformed on the crank shaft 2 side by means of a stepped section 24 to form a connecting part 25, and an outer peripheral section is transformed on the transmission 3 side by means of a stepped section 26 to form a connecting part 27. The connecting part 25 and an end face of the crank shaft 2 are connected by bolts 28, and the connecting part 27 and an end face of the transmission 3 are connected by bolts 29.

A planar rotor base 31 is formed orthogonal to the axis C, between the stepped section 24 and the stepped section 26 of the drive plate 23. Plate magnets 21 having their pole faces facing in a direction along the axis C are mounted in plural on the face of the rotor base 31 on the engine 1 side, and a rotor 30 of the motor 20 is formed by means of the rotor base 31 and the magnets 21. A stator 32 having coils 22 arranged facing the magnets 21 of the rotor 30, is provided on the engine 1 side, and the rotor 30 drives by means of a rotating magnetic field generated between the stator 32 and the rotor 30. Resin molding or plating is applied to the magnets 21 to protect the surface.

The stator 32 is provided with a flat stator core section 33 formed by laminating a core material such as silicon steel plate for example. The stator core section 33 has a yoke section 34 orthogonal to the axis C, and a rim section 35 provided on an outer edge of the yoke section 34. Salient poles 36 which oppose the magnets 21 of the rotor 30 in a direction along the axis C are provided in plural on the face of the yoke section 34 on the transmission 3 side. A coil 22 is formed on each salient pole 36 by winding a band-like (or round) conductor parallel to the face of the yoke section 34. The stator core section 33 is retained by a housing 37, and the stator 32 is fixed to the engine 1 via this housing 37. A predetermined space (air gap) is provided between each salient pole 36 and the magnets 21 of the rotor 30.

Figure 2:
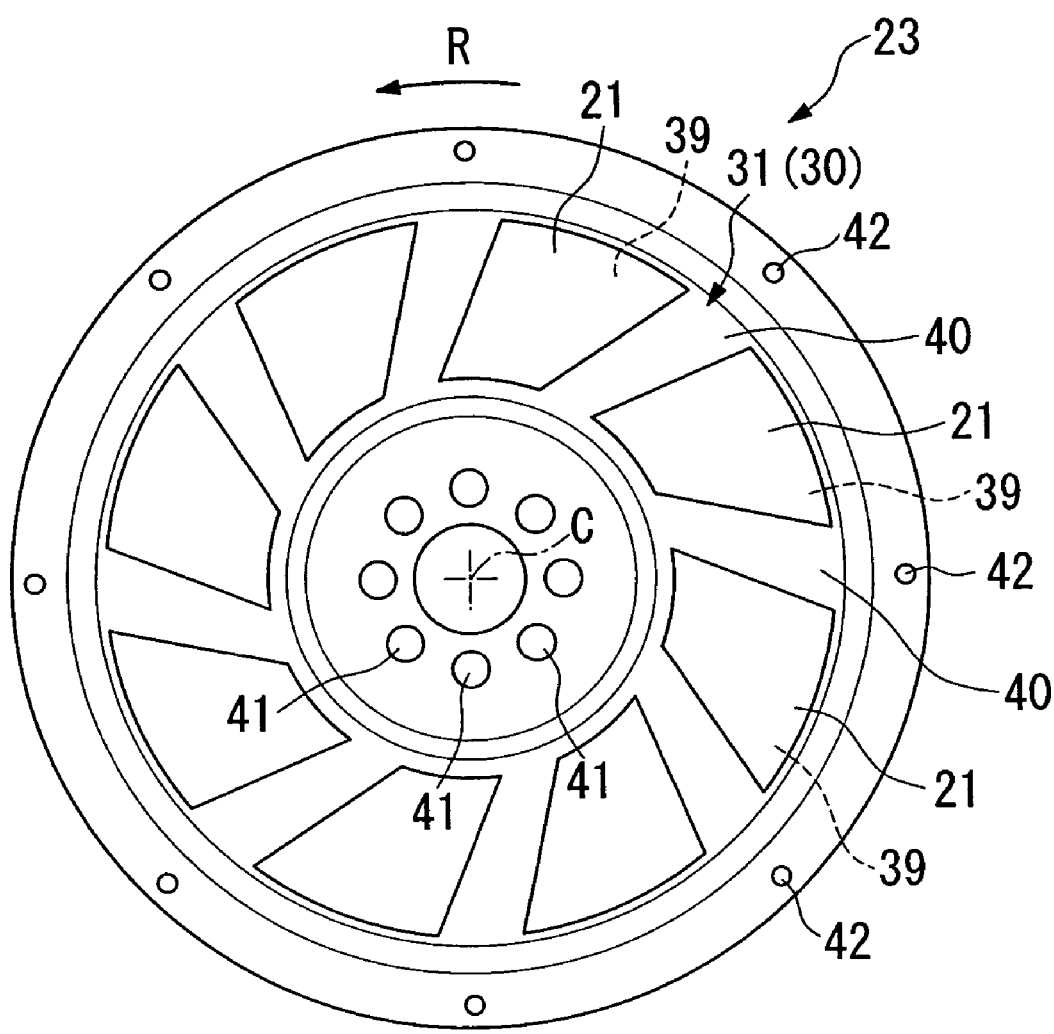
FIG. 2 is a diagram showing a drive plate when viewed from the direction of the arrow A in FIG. 1.

As shown in FIG. 2, the rotor base 31 of the drive plate 23 is formed in an annular shape centered on the axis C, and on the face of this rotor base 31 on the engine 1 side, eight magnets 21 are uniformly lined up around the circumference direction, with a predetermined interval between each adjacent magnet 21. Each magnet 21 is formed as an approximate sector shape inclined in the counter rotational direction of the drive plate 23 from the central section towards the outer peripheral section of the drive plate 23 (clockwise in FIG. 2), and are arranged so that the pole face of the North pole and the pole face of the South pole are alternately lined up around the circumference direction. Accordingly, the section where the magnets 21 are not mounted, provided between each magnet 21 is provided so as to be inclined in the counter rotational direction of the drive plate 23, with respect to the radial direction of the drive plate 23, from the central section towards the outer peripheral section of the drive plate 23.

Figure 3A:
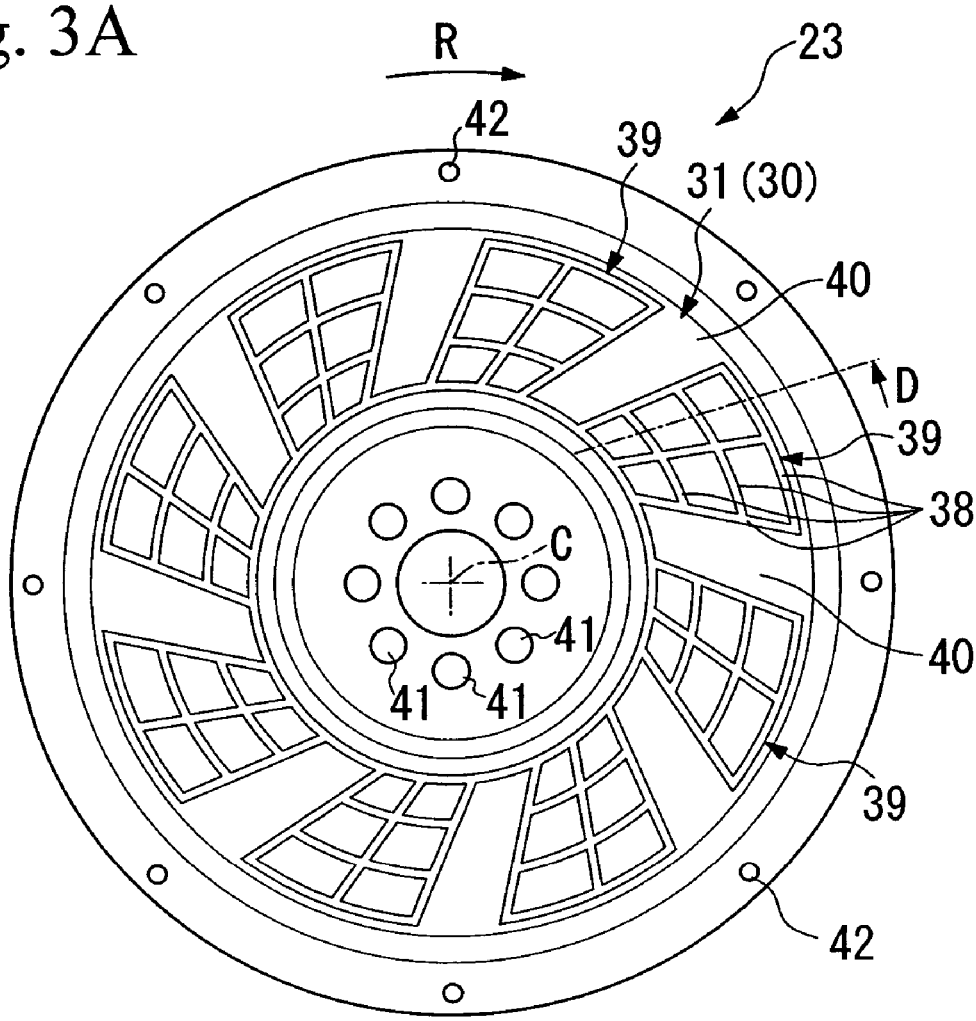
Figure 3B:
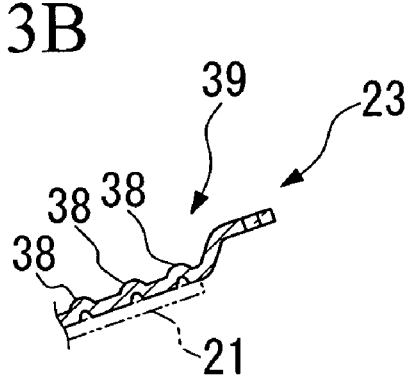

Here, as shown in FIG. 3A, ribs 38 are formed on the underside for example of the mounting section for the magnets 21 in the rotor 30. The ribs 38 are protrudingly provided on the transmission 3 side so as to not interfere with the magnets 21 (see FIG. 3B), and these ribs 38 form a highly rigid section 39 whereby the mounting section for the magnets 21 of the rotor 30 is maintained at a desired rigidity. Also, a resilient section 40 for allowing a predetermined elastic deformation is formed in the section where the magnets 21 are not mounted in the rotor 30, where the ribs 38 and the like are not formed. By combining the highly rigid section 39 and the resilient section 40, the drive plate 23 is provided with an intrinsic elastic property. An arrow R in the drawing denotes the rotational direction of the drive plate 23.

As a result, the highly rigid section 39 which is the mounting section for the magnets 21, is capable of relative displacement in the circumference direction and the radial direction, by means of the resilient section 40 which allows a predetermined deformation. In the drive plate 23, there are eight bolt holes 41 provided in the central section thereof for connecting to the crank shaft 2, and there are eight bolt holes 42 provided in the peripheral section for connecting to the transmission 3.

Figure 4:
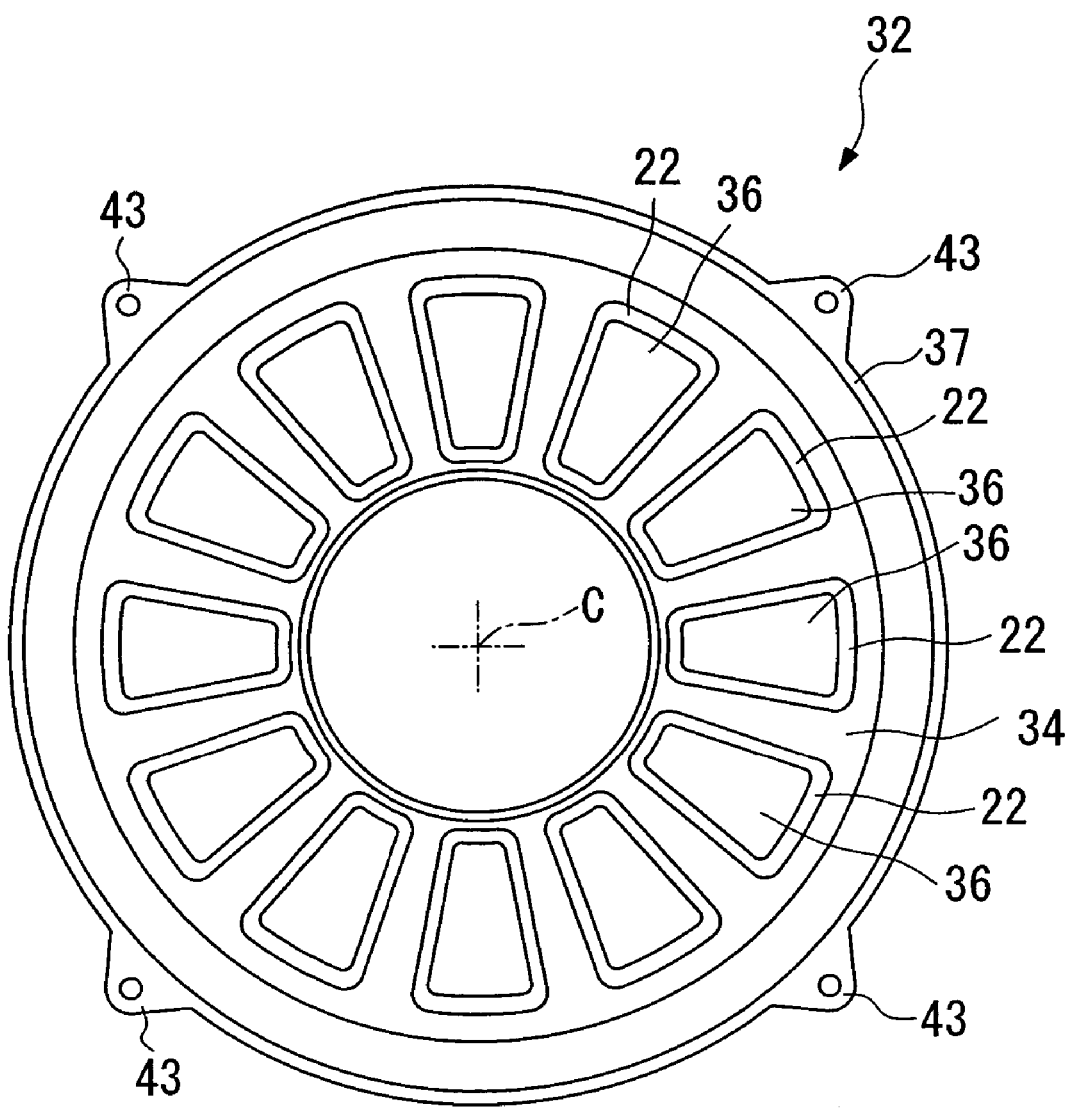
FIG. 4 is a diagram showing a stator viewing from the arrow B in FIG. 1.

As shown in FIG. 4, the yoke 34 of the stator core section 33 is formed in a disk shape, the central section of which has been punched out with the axis C as the center. Twelve coils 22, partitioned in the same shape along the radial direction, are lined up around the circumference direction on the face of this yoke 34 on the transmission 3 side, with a predetermined space between each adjacent coil 22. By connecting each of these coils 22 so as to form three phases, and supplying driving currents U, V, and W in which the phases in each phase of the coils 22 differs by 120°, a rotating magnetic field is created between the stator 32 and the rotor 30. Reference symbol 43 denotes a fixing part provided in the housing 37. This fixing part 43 is for securing the stator 32 to the engine 1.

According to the embodiment described above, because the motor 20 which is arranged between the engine 1 and the transmission 3 is an axial gap type, the facing surface area of the magnets 21 of the rotor 30 and the coils 22 of the stator 32 can be maintained in the radial direction with no protrusion of the coil ends in the axial direction, so that as well as maintaining the driving performance of the motor, the motor can be made thinner. Accordingly, the axial direction length of the drive system and the transmission system in a hybrid vehicle can be reduced.

Also, by using the drive plate 23 as part of the motor 20, it is possible to rationally achieve a reduction in the number of parts, and reduced weight. At this time, because the flat drive plate 23 orthogonal to the axis C of the crank shaft 2 is part of the axial gap type motor 20, the intrinsic shape of the drive plate 23 can be effectively used, and weight can be effectively reduced without the need for reinforcement and so on. Moreover, because the drive plate 23 is integrally formed with the rotor 30 by press-forming, it is possible to reduce the production costs of the motor 20 by reducing processes such as cutting and welding.

Because the mounting section for the magnets 21 in the rotor 30 is a highly rigid section 39 which is formed by the deformation suppressing ribs 38, and the section where the magnets 21 are not mounted is a resilient section 40 which allows a predetermined elastic deformation, the drive plate 23 is provided with an intrinsic elastic property. Since the magnets 21 usually have no elasticity, there is concern that if the mounting section for the magnets 21 deforms, they may fall off or be damaged. However, by having a desired rigidity for the mounting section for the magnets 21, and elastically deforming the section where the magnets are not mounted, the entire drive plate 23 can be elastically deformed without causing the mounting section for the magnets 21 to deform. Accordingly, the intrinsic function of the drive plate 23 of accommodating disparity of centers can be made compatible with the function of preventing damage or coming off of the mounted magnets 21.

Moreover, because the resilient section 40 is provided so as to be inclined in the counter rotation direction of the drive plate 23, so that the highly rigid section 39 which is the mounting section for the magnets 21 is capable of relative displacement in the circumference direction and the radial direction, the function of accommodating disparity of centers can be enhanced. Also, there is concern that, due to the rotor 30 and the drive plate 23 being functionally integrated, torque ripple (thrust pulsations) of the motor 20 may cause vibration to occur in the drive plate 23, generating resonance. However, because the resilient section 40 is provided inclined in the radial direction, the rotor 30 has a skew structure (twist structure), which reduces the torque ripple and thus suppresses resonance.

Next, a second embodiment of the present invention will be described, based on FIG. 6 which corresponds to FIG. 3 of the first embodiment. Parts the same as in the first embodiment are denoted by the same reference symbols.

Figure 6A:
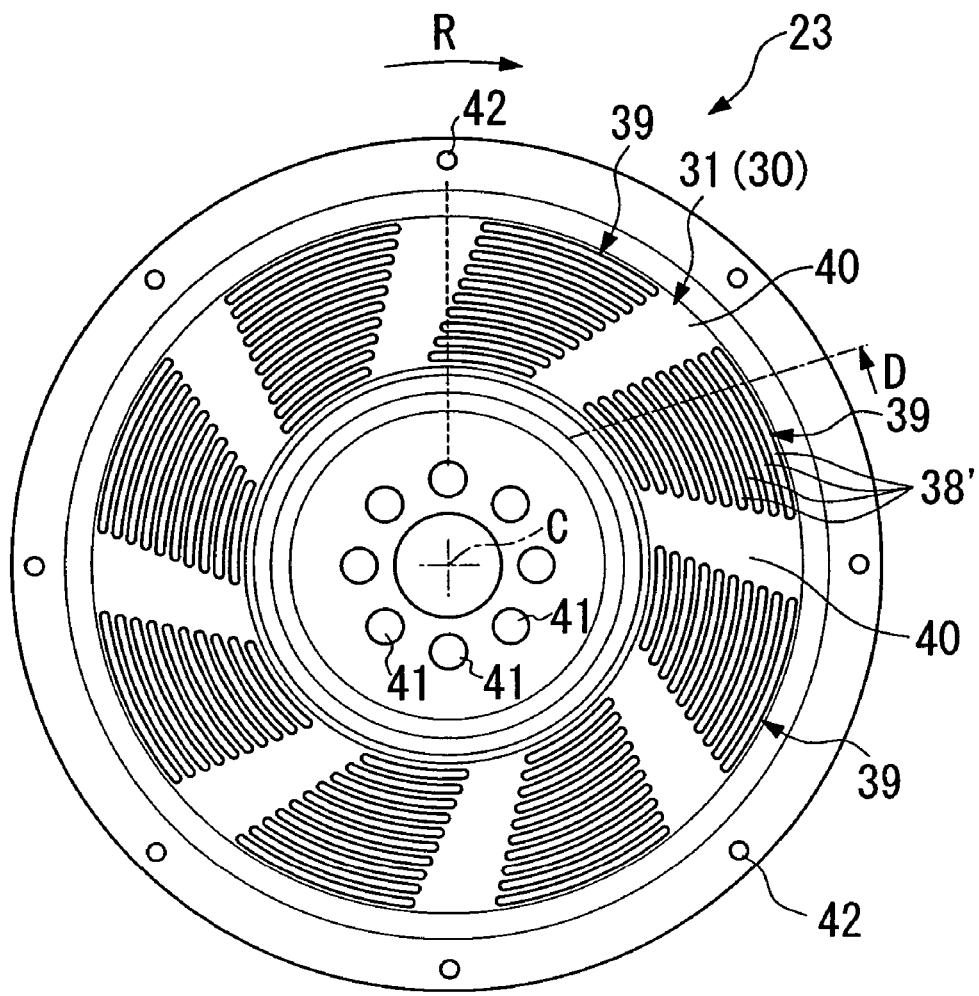
FIGS. 6A and 6B are diagrams showing a drive plate according to a second embodiment of the present invention.
Figure 6B:
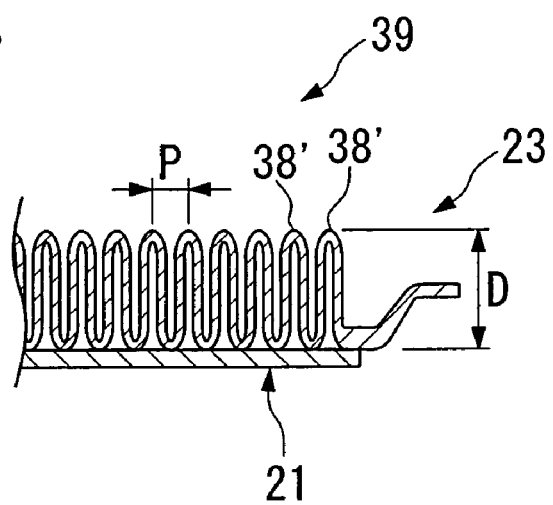
Figure 7:
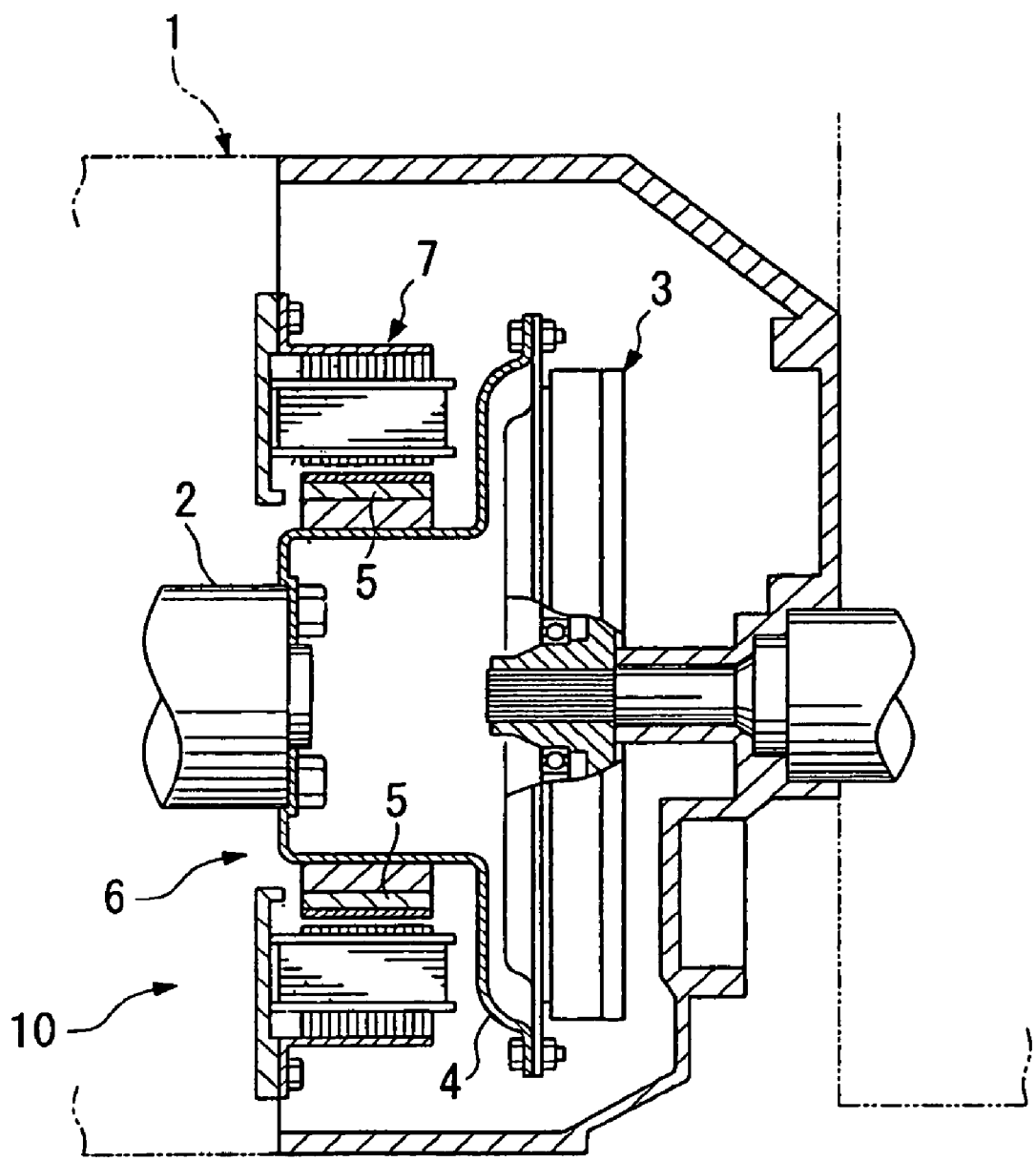
FIG. 7 is an explanatory cross-sectional diagram of a conventional motor.

Here, as shown in FIG. 6A, a plurality of ribs 38' is formed on the underside of the mounting section for the magnets 21 in the rotor 30. These ribs 38' are protrudingly provided in curve form on the transmission 3 side so as to not interfere with the magnets 21 (see FIG. 6B), and these ribs 38' form a highly rigid section 39 whereby the mounting section for the magnets 21 in the rotor 30 is maintained at a desired rigidity. Also, for these ribs 38', a degree of protrusion D is set high with respect to a pitch P, so as to maintain a certain number of formed parts and to also function as cooling fins.

Here, the ribs 38' are not formed in the section where the magnets 21 are not mounted in the rotor 30, to thus give a resilient section 40 which allows a predetermined elastic deformation. By combining the highly rigid section 39 and the resilient section 40, the drive plate 23 is provided with an intrinsic elastic property.

As a result, the highly rigid section 39 which is the mounting section for the magnets 21 is capable of relative displacement in the circumference direction and radial direction, by means of the resilient section 40 which allows a predetermined deformation. Furthermore, in the same way as in the first embodiment, there are eight bolt holes 41 provided in the central section of the drive plate 23 for connecting to the crank shaft 2, and there are eight bolt holes 42 provided in the peripheral section for connecting to the transmission 3.

Accordingly, in addition to the same effects mentioned for the previous embodiment, according to this embodiment, because the plurality of ribs 38' function as cooling fins, even if excess current occurs within the magnets 21, due to an increase in magnetic flux frequency at times of high speed of the rotor 30, causing the magnets 21 to generate heat, this heat is removed by the high speed air flow effectively cooling the magnets 21 from the underside, so that is possible to reliably prevent the magnets 21 from generating heat. Therefore, the thermal loading can be reduced by effective use of the plurality of ribs 38'.

The present invention is not limited to the above embodiments, and a structure is also possible in which a difference in rigidity is obtained between the mounting section for the magnets 21 and the section where the magnets are not mounted, of the rotor 30, by for example, making the mounting section for the magnets 21 of the drive plate 23 a thick-wall part having the desired rigidity, and making the section where the magnets 21 are not mounted a thin-wall part allowing a predetermined deformation. As a result, the intrinsic function of the drive plate 23 of accommodating disparity of centers can be made compatible with the function of preventing damage or falling off of the magnets 21, and as well as this, the rigidity of the mounting section for the magnets 21 can be reliably increased enabling an improvement in the retention of the magnets 21.

Figure 5:
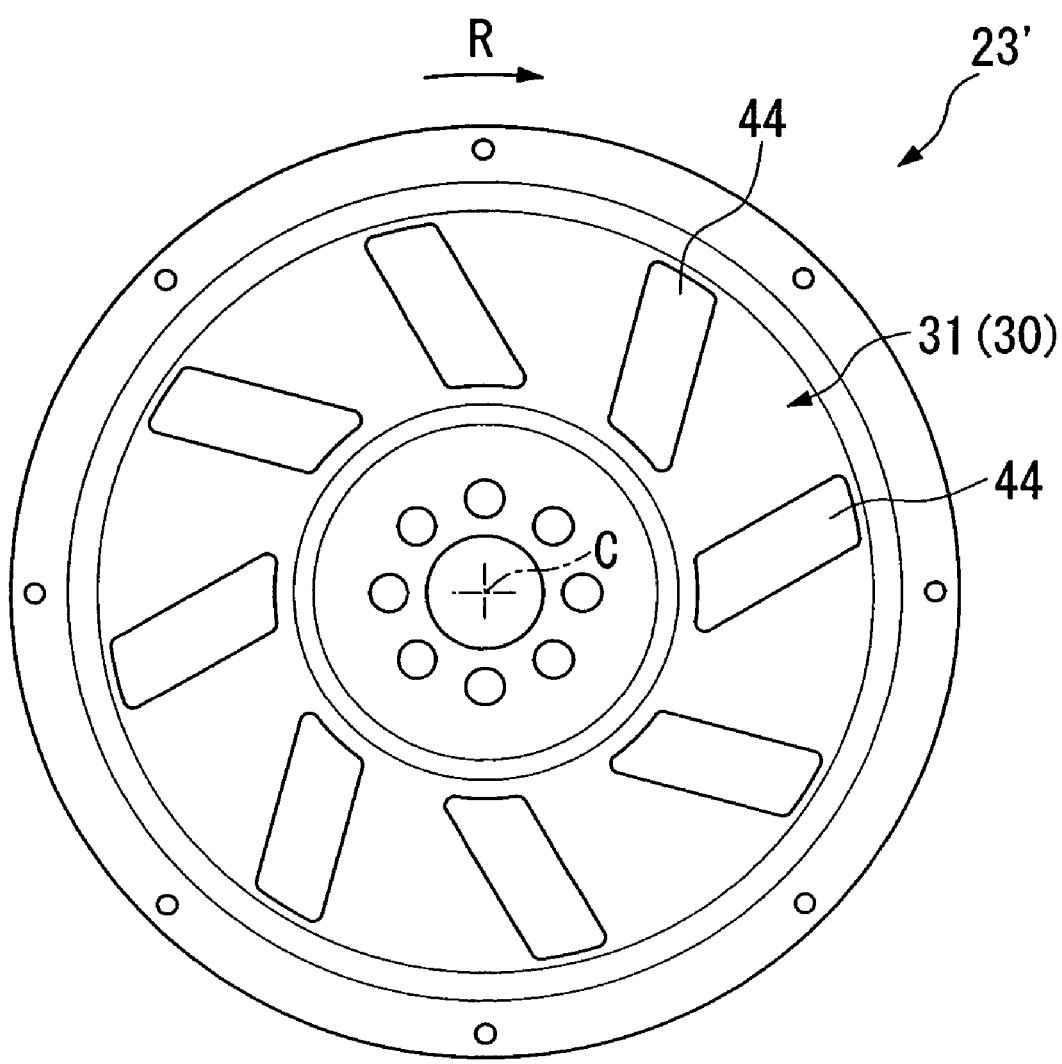
FIG. 5 is a diagram showing a modified example of the drive plate viewing from the arrow B, similarly to FIG. 3A.

Also, as in the drive plate 23' shown in FIG. 5, a structure is possible in which a difference in rigidity is obtained between the mounting section for the magnets 21 and the section where the magnets are not mounted, of the rotor 30, by providing inclined elongate apertures 44 at locations corresponding to the sections where the magnets 21 are not mounted. As a result, any disparity of centers can be accommodated by the elongate apertures 44 bending so as to deform, the magnets 21 can be retained, and the drive plate 23 can be made lighter. Here, instead of the elongate apertures 44, a plurality of round holes my be provided.

As described above, according to the first aspect of the invention, the motor arranged between the engine and the transmission can be an axial gap type motor formed flat along the drive plate, with coil ends which do not protrude in the radial direction. Therefore, as well as maintaining the driving performance of the motor, the motor can be made thin, with the effect that the axial length of the drive system and the transmission system in the hybrid vehicle can be shortened.

According to the second aspect of the invention, it is possible to form an axial type rotor section by effectively using the intrinsic shape of the drive plate. Therefore there is the effect that the weight can be rationally reduced without the need for reinforcement or the like, and also the number of parts can be reduced. Moreover, there is the effect that a reduction in costs can be achieved by shortening the production process.

According to the third aspect of the invention, the magnets can be retained at the highly rigid section, and the intrinsic resilient property of the drive plate can be reproduced by deforming the resilient section. Therefore, there is the effect that as well as preventing falling off or damage to the magnets, any disparity of centers of the respective axes can be accommodated.

According to the fourth aspect of the invention, maintaining the length of the resilient section makes it easy to bend, and relative displacement of each highly rigid section in the circumference direction and radial direction is also possible. Therefore there is the effect that the function of accommodating disparity of centers can be enhanced. Also, there is the effect that resonance caused by torque ripple of the motor is suppressed.

According to the fifth aspect of the invention, it is possible to provide a difference in rigidity between the highly rigid section and the resilient section by the presence or absence of the ribs. Therefore there is the effect that as well retaining the magnets, the intrinsic elastic property of the drive plate can be reproduced.

According to the sixth aspect of the invention, it is possible to provide a difference in rigidity between the highly rigid section and the resilient section by the presence or absence of the ribs. Therefore there is the effect that as well retaining the magnets, the intrinsic elastic property of the drive plate can be reproduced. Furthermore, it is possible to increase the degree of protrusion of the ribs so that they function as cooling fins. Therefore there is the effect that the thermal load can be reduced by effective use of the ribs.

According to the seventh aspect of the invention, by increasing the plate thickness the rigidity of the highly rigid section can be reliably increased so that it is possible to provide a difference in rigidity between the highly rigid section and the resilient section. Therefore, there is the effect that as well as reproducing the intrinsic elastic property of the drive plate, the magnets can be reliably retained.

According to the eighth aspect of the invention, it is possible to provide a difference in rigidity between the highly rigid section and the resilient section, by the presence or absence of apertures. Therefore, there is the effect that as well as reproducing the intrinsic elastic property of the drive plate, the magnets can be reliably retained, and also to the drive plate can be made lighter.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

What is claimed is:

1. A motor comprising a rotor and a stator, arranged between an internal combustion engine and a transmission for a hybrid vehicle, the rotor comprising:
   a drive plate which connects a crank shaft of said engine to said transmission;
   a rotor base section mounted on said drive plate orthogonal to an axis of said crank shaft, and
   a plurality of magnets having pole faces facing in a direction along said axis mounted on said rotor base section; and the stator comprising:
   a plurality of conductive coils arranged so as to face the magnets of said rotor in a direction along said axis, wherein:
   mounting sections for the magnets on said rotor base section are highly rigid sections having a predetermined rigidity, and non-mounting sections of the rotor base section where the magnets are not mounted are resilient sections allowing a predetermined elastic deformation, wherein the mounting sections and the non-mounting sections are arranged in alternation with each other.

2. The motor for a hybrid vehicle according to claim 1, wherein said drive plate and said rotor base section are integrally formed by press-forming.

3. A motor for a hybrid vehicle according to claim 1, wherein said resilient sections are provided so as to be inclined with respect to a radial direction of said rotor.

4. A motor for a hybrid vehicle according to claim 1, wherein ribs are formed in said highly rigid section for suppressing deformation.

5. A motor for a hybrid vehicle according to claim 1, wherein a plate thickness of each highly rigid section is thicker than the plate thickness of each resilient section.

6. A motor for a hybrid vehicle according to claim 1, wherein each resilient section has an aperture which induces deformation.

* * * * *